United States Patent
Ash, Jr. et al.

(10) Patent No.: US 8,559,869 B2
(45) Date of Patent: Oct. 15, 2013

(54) SMART CHANNEL SELECTIVE REPEATER

(76) Inventors: Daniel R. Ash, Jr., Laguna Niguel, CA (US); Daniel R. Ash, Sr., Drain, OR (US); Joseph Storniolo, Huntington Beach, CA (US)

( * ) Notice: Subject to any disclaimer, the term of this patent is extended or adjusted under 35 U.S.C. 154(b) by 0 days.

(21) Appl. No.: 13/591,152

(22) Filed: Aug. 21, 2012

(65) Prior Publication Data

US 2013/0072207 A1 Mar. 21, 2013

Related U.S. Application Data

(63) Continuation-in-part of application No. 13/238,894, filed on Sep. 21, 2011, now Pat. No. 8,248,314, and a continuation-in-part of application No. 13/590,053, filed on Aug. 20, 2012.

(51) Int. Cl.
*H04B 7/15* (2006.01)

(52) U.S. Cl.
USPC ...................................... 455/11.1; 455/575.1

(58) Field of Classification Search
USPC ........ 455/11.1, 7, 571, 550.1, 73, 575.1, 509, 455/516
See application file for complete search history.

(56) References Cited

U.S. PATENT DOCUMENTS

| | | | | |
|---|---|---|---|---|
| 5,907,794 | A * | 5/1999 | Lehmusto et al. | 455/11.1 |
| 5,983,072 | A * | 11/1999 | Schroderus | 455/11.1 |
| 6,132,306 | A * | 10/2000 | Trompower | 455/11.1 |
| 6,697,603 | B1 * | 2/2004 | Lovinggood et al. | 455/13.1 |
| 8,027,635 | B2 * | 9/2011 | Wee et al. | 455/11.1 |
| 8,150,309 | B2 * | 4/2012 | Braithwaite | 455/7 |
| 2001/0051537 | A1 | 12/2001 | Nakamura et al. | |
| 2002/0154066 | A1 | 10/2002 | Barna et al. | |
| 2005/0088345 | A1 | 4/2005 | DeLa Torre Barreiro et al. | |
| 2006/0052112 | A1 | 3/2006 | Baussi et al. | |
| 2007/0218951 | A1 | 9/2007 | Risheq et al. | |
| 2010/0075595 | A1 | 3/2010 | DeMarco et al. | |

* cited by examiner

*Primary Examiner* — Sonny Trinh
(74) *Attorney, Agent, or Firm* — Patent Law & Venture Group; Gene Scott

(57) ABSTRACT

A system and method for processing signals in a selected channel through a repeater wherein the repeater is dynamically adapted to the channel by receiving channel information from a local cell phone, such information including modulation and channel designation.

7 Claims, 4 Drawing Sheets

SMART CHANNEL SELECTIVE REPEATER

RELATED APPLICATIONS

This application is a Continuation-In-Part of co-pending non-provisional application Ser. No. 13/238,894, filed on Sep. 21, 2011 and Ser. No. 13/590,053, filed on Aug. 21, 2012 and claims international date priority thereof. The subject matter of both priority applications is hereby incorporated herein by reference in their entirety.

FIELD OF THE DISCLOSURE AND BACKGROUND

This disclosure relates to the field of wireless telecommunications especially in the field of cellular telephony, and more particularly to a cellular repeater and its method of operation and especially for frequency selective operation.

Cellular telephony in the United States operates on the 850 MHz and 1900 MHz bands and other bands are also coming into use. Each of these bands are divided into channels and each channel is able to carry a large number of separate telephony signals where each signal is centered on a specific UHF frequency. More than one user is able to use a frequency simultaneously since multiplexing is able to allow frequency sharing. Multiplexing today includes: time domain, frequency domain and CDMA (code division multiple access). All three are used in the cellular phone service industry.

Cell phones automatically capture and switch their operation to a specific frequency and multiplexing protocol that is identified to it by a base station during a handshake process. Because of mobility, the cell phone may be handed-off frequently to a different base station which may require a change in the frequency used, i.e., another handshake. The frequency of use and multiplex protocol is stored in cell phone memory.

Cellular repeaters are bidirectional amplifiers and are widely used for cellular traffic. They improve signal strength in low signal zones such as building interiors and outlying areas. This results in fewer dropped calls and improved cell phone battery life due to lower power requirement. Currently in the market place, there are two common types of repeaters. The first type is a low cost consumer-grade repeater. This repeater is broad band and amplifies all received signals which adds greatly to the noise background in any one of the signals. The second type is a commercial-grade, higher-cost, so-called "off-the-air" repeater which is usually dedicated to a specific commercial carrier. The present disclosure describes a system and method of operation that combines low-cost and mobility while achieving low noise and specific channel selection and isolation.

SUMMARY

The repeater system and method described herein uses frequency selection and modulation information derived directly from a local user's cell phone and filters all other signal traffic so as to produce superior signal quality with low noise and cross-talk. The repeater discriminates to pass only the signals between the cell phone and base station currently being used. The repeater may function in this same manner independently for multiple cell phones depending on its capacity for simultaneous processing. The key novelty is that the user's cell phone dictates the frequency of use allowing the repeater to selectively pass signals centered on this frequency and reject others. The repeater may be incorporated into a cell phone sleeve such as described in incorporated application U.S. Ser. No. 13/238,894.

An object of the presently described system and method is to use information stored in a nearby user's cell phone to control the operation of a repeater in order to reduce noise and spurious signals in neighboring channels and frequencies.

Details of one or more embodiments of these concepts are set forth in the accompanying drawings and the description below. Other features, objects, and advantages of these concepts will be apparent from the description and drawings, and from the claims.

BRIEF DESCRIPTION OF DRAWING FIGURES

Like reference symbols in the various drawing figures indicate like elements.

DETAILED DESCRIPTION

The presently disclosed apparatus is a smart frequency selective repeater 10. It utilizes frequency information received from a nearby cell phone 20 to adjust signal filtering in order to boost signal strength at a selected frequency between the cell phone 20 and the base station BS. While the concept of a frequency selective repeater is not new, the concept of utilizing cell phone frequency information stored in the cell phone memory for improved filtering and discrimination is novel and is a great improvement in the field of cellular telephony.

The term "cell phone" as used herein shall be understood to mean cell phones literally and also any other portable or mobile device capable of cellular telephony. Repeater 10 as disclosed herein may be deployed by a cellular service provider or by a cell phone user and may provide a significant improvement in communication quality and battery life. Such a repeater 10, as defined in FIGS. 1-3 may be incorporated into a cell phone sleeve as discussed.

Cell phones 20 adapt their operating frequency as dictated by the base stations BS through which they operate. This operating frequency is stored in cell phone memory which is very well known. The operating frequency is transmitted by the cell phone 20 continuously in accordance with a software application 25 stored in cell phone memory and executed by the cell phone's processor. Repeater 10 receives the cell phone's signal and adjusts its process to the operating frequency.

Figure 1:
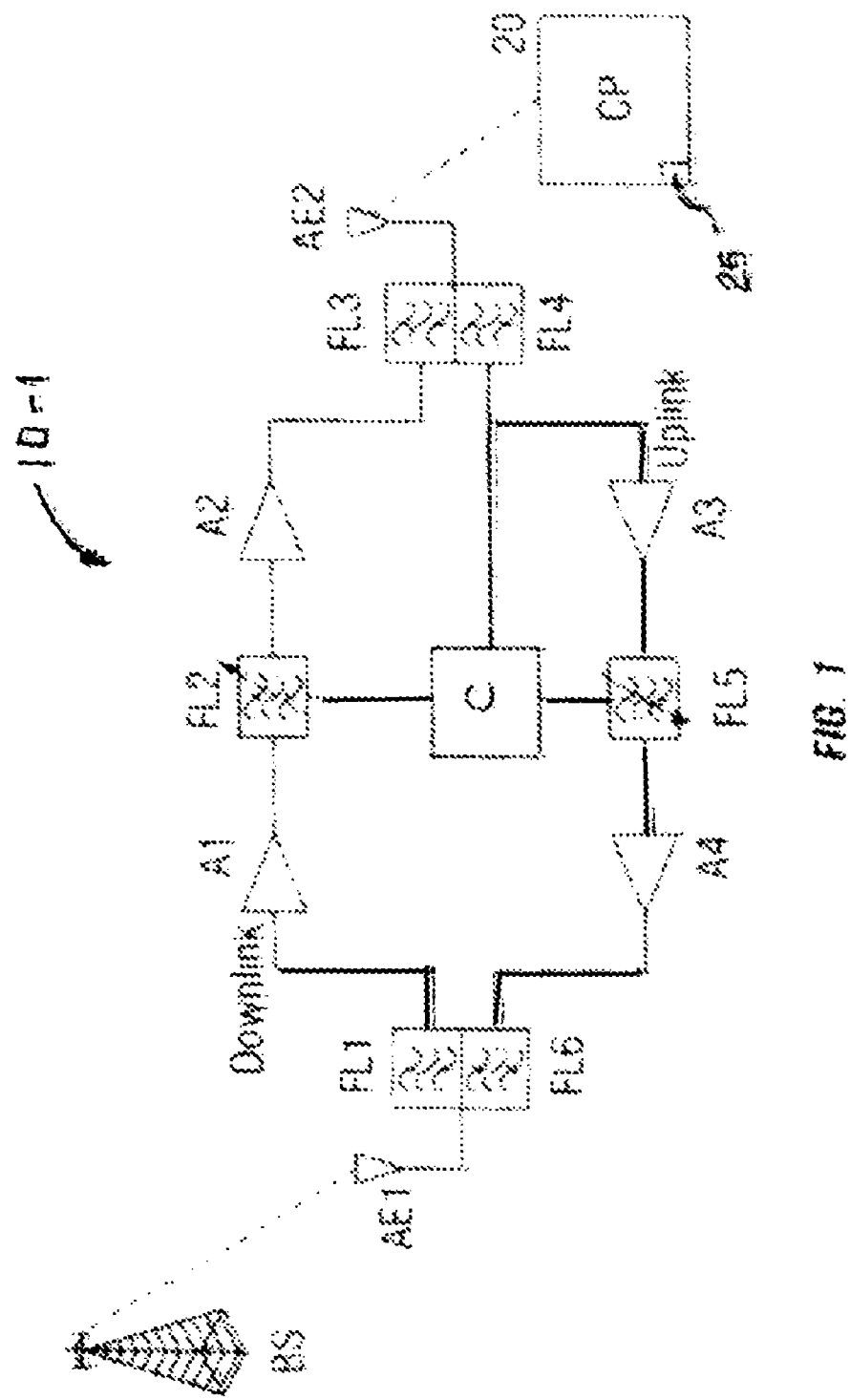
FIG. 1 is an example schematic diagram of the presently disclosed system for processing signals in a selected channel through a repeater dynamically adapted using variable filters.

FIG. 1 discloses repeater 10 in a first embodiment having a circuit downlink path including antenna AE1, filter FL1, amplifier stage A1, variable filter FL2, amplifier stage A2, filter FL3 and antenna AE2. An uplink path includes antenna AE2, filter FL4, amplifier stage A3, variable filter FL5, amplifier stage A4, filter FL6 and antenna AE1. A controller C, such as model SAM9 manufactured by Atmel, Inc. receiving the operating frequency designation, adjusts FL2 and FL5 each of which may be a model Micro-400-700 manufactured by Pole Zero, Inc. to pass only a band centered on the operating frequency. This circuit enables information relayed from base station BS to cell phone 20 to be used to adjust the band pass within the circuit so as to exclude other frequencies and noise and only repeat and boost a selected RF frequency or pass band of frequencies. In this embodiment all analog components function at RF frequencies. This has the advantage of being relatively less expensive, however, it does not achieve the out of band frequency and noise rejection that a circuit operating at an intermediate frequency (IF) can achieve.

Figure 2:
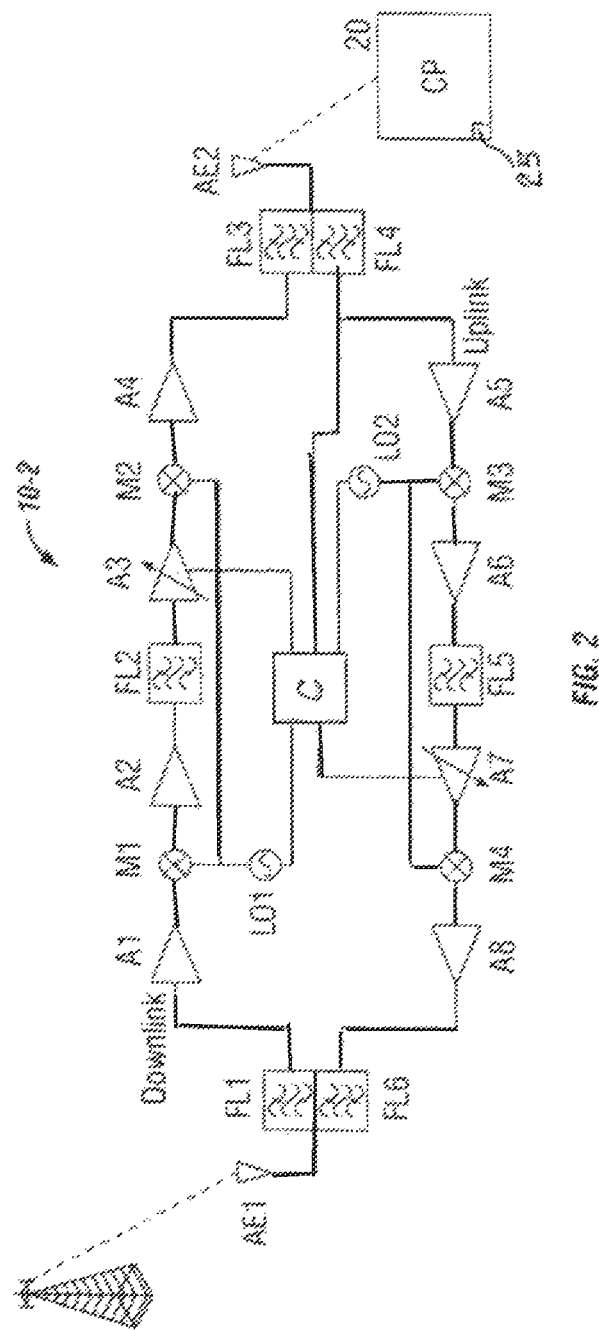
FIG. 2 is an example schematic diagram of the system whereby frequency selection is achieved through local oscillator frequency adjustment.
Figure 3:
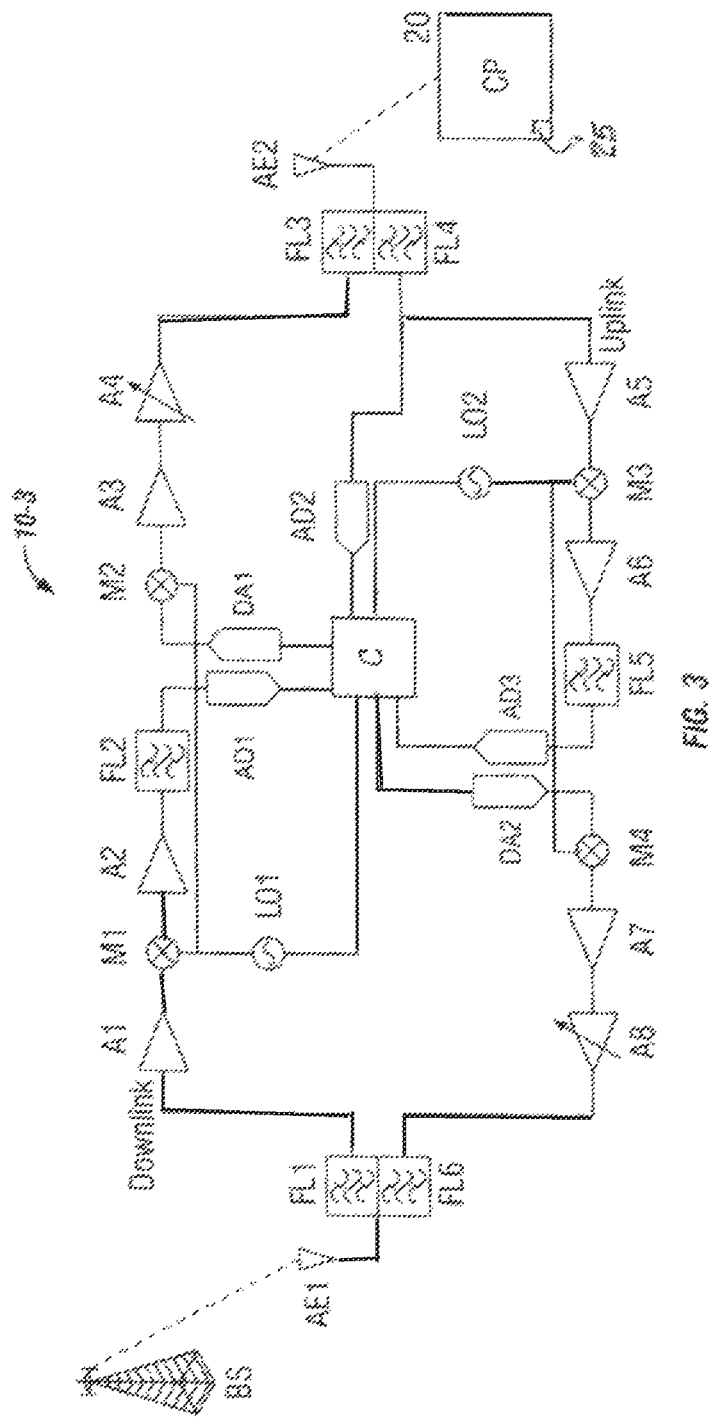
FIG. 3 is an example schematic diagram of the system of FIG. 2 wherein digital signal control is used.
Figure 4:
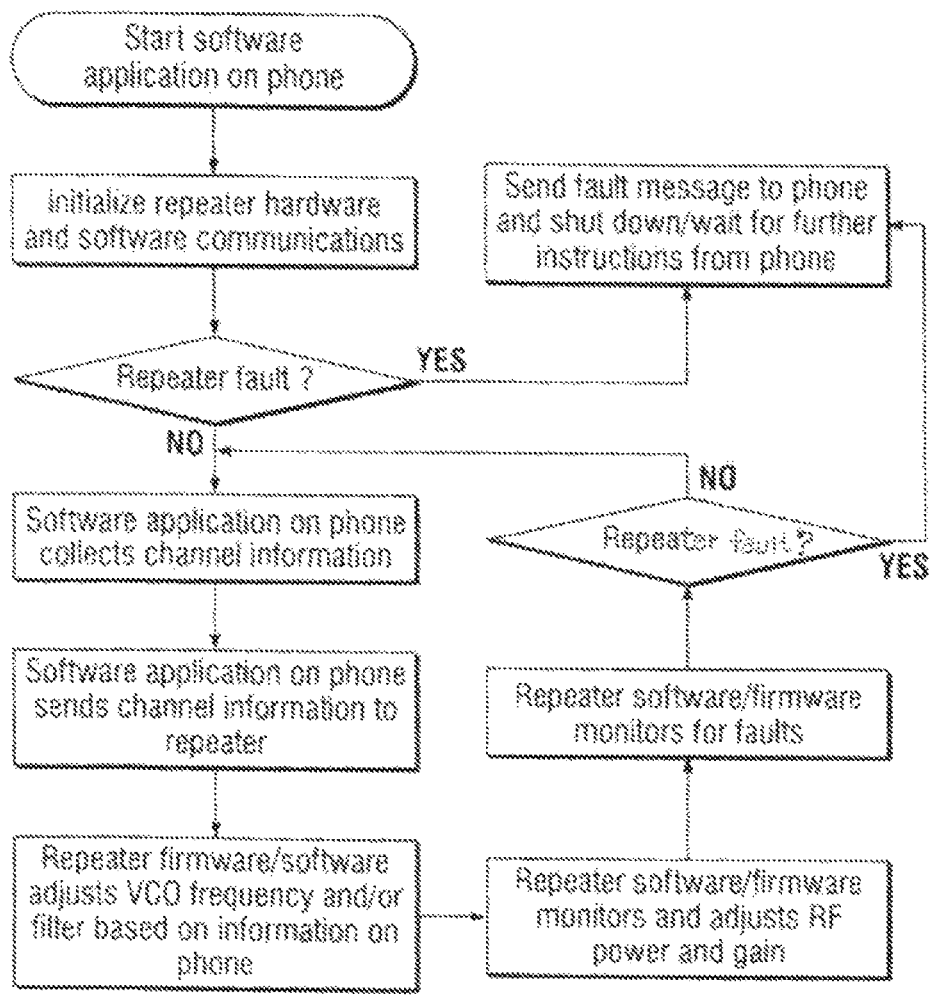
FIG. 4 is an example software logic diagram of a process of the system.

FIG. 2 discloses a further embodiment having a downlink path including antenna AE1, RF filter FL1, amplifier stage A1, mixer M1, local oscillator LO1, amplifier stage A2, IF filter FL2, IF variable gain amplifier stage A3, mixer M2, RF amplifier stage A4, RE filter FL3 and antenna AE2. An uplink path includes antenna AE2, RF filter FL4, RF amplifier stage A5, mixer M3, local oscillator LO2, IF amplifier stage A6, IF filter FL5, variable IF amplifier stage A7, mixer M4, RF amplifier stage A8, RF filter FL6, and antenna AE1. As with the circuit of FIG. 1, controller C receives the operating frequency information from cell phone 20. Controller C adjusts their band pass by adjusting the local oscillator LO1, LO2 IF. As above, this circuit enables information relayed from base station BS to cell phone 10 to adjust the band pass within the circuit so as to exclude other frequencies and noise and only repeat and boost a selected RF frequency or pass band of frequencies. In this embodiment the drawback of the circuit of FIG. 1 is avoided since filtering and amplification functions are able to be conducted in the IF frequency range. FIG. 3 operates in the same manner as the circuit of FIG. 2 with the improvement of digital processing at controller C which results in an improved control over LO1 and LO2.

In the circuits shown in FIGS. 2 and 3 filtering and amplification is conducted in the IF range. As is known, it is difficult to build amplifiers, filters, and detectors that can be tuned to different frequencies, but it is easy to build tunable oscillators. Also, in RF communications, converting to a lower intermediate frequency offers an advantage because RF amplifiers have upper frequency gain limits so that a lower IF offers the possibility of higher gain. Also, at IF, filtering to extract a single frequency from signals that are close together is easier and noise is also easier to exclude. This is because a filter's bandwidth increases proportionately with the signal's frequency. So a narrower bandwidth and more selectivity can be achieved by converting the signal to an IF. The IF used may be 10.7 MHz or a frequency in that range.

The circuits shown in FIGS. 1-3 are examples of how the novelty of the present disclosure may be achieved and these may be considered to be "best mode." However, other repeater circuits may also apply the novel features disclosed herein.

The common functions of signal reception and transmission, filtering, amplification, mixing using a local oscillator, and converting between analog and digital signal forms are well known in the field so that further details of those functions and the nature of these operations is not further described herein. The "Electrical Engineering Reference Manual," ISBN; 9781591261117 is incorporated herein by reference in its entirety to provide details and technical support related to the elements and functions presented herein.

Embodiments of the subject apparatus and method have been described herein. Nevertheless, it will be understood that various modifications may be made without departing from the spirit and understanding of this disclosure. Accordingly, other embodiments and approaches are within the scope of the following claims.

What is claimed is:

1. A system for improving cellular telephony, the system comprising:
    a cell phone tunable to a cellular channel via a command received from a base station;
    the cell phone nested within a sleeve assembly, the sleeve assembly containing a channel selective repeater;
    the channel selective repeater tunable to the cellular channel via a further command received from the cell phone; and
    the channel selective repeater adapted for signal exchange with the cell phone and the base station within the cellular channel.

2. The system of claim 1 wherein the repeater has at least one of a variable RF signal filter, a variable gain amplifier, and a digital signal filter.

3. The system of claim 1 wherein the repeater has a means for processing the signals at an intermediate frequency.

4. The system of claim 1 further comprising a means for processing the signals digitally.

5. The system of claim 1 further comprising a means for adjusting one of a variable RF signal filter and a digital signal filter to pass signals within the channel exclusively.

6. The system of claim 1 further comprising a means for adjusting a variable gain amplifier to amplify signals within the channel exclusively.

7. The system of claim 1 further comprising a means for converting said signals between analog and digital forms.

* * * * *